UNITED STATES PATENT OFFICE.

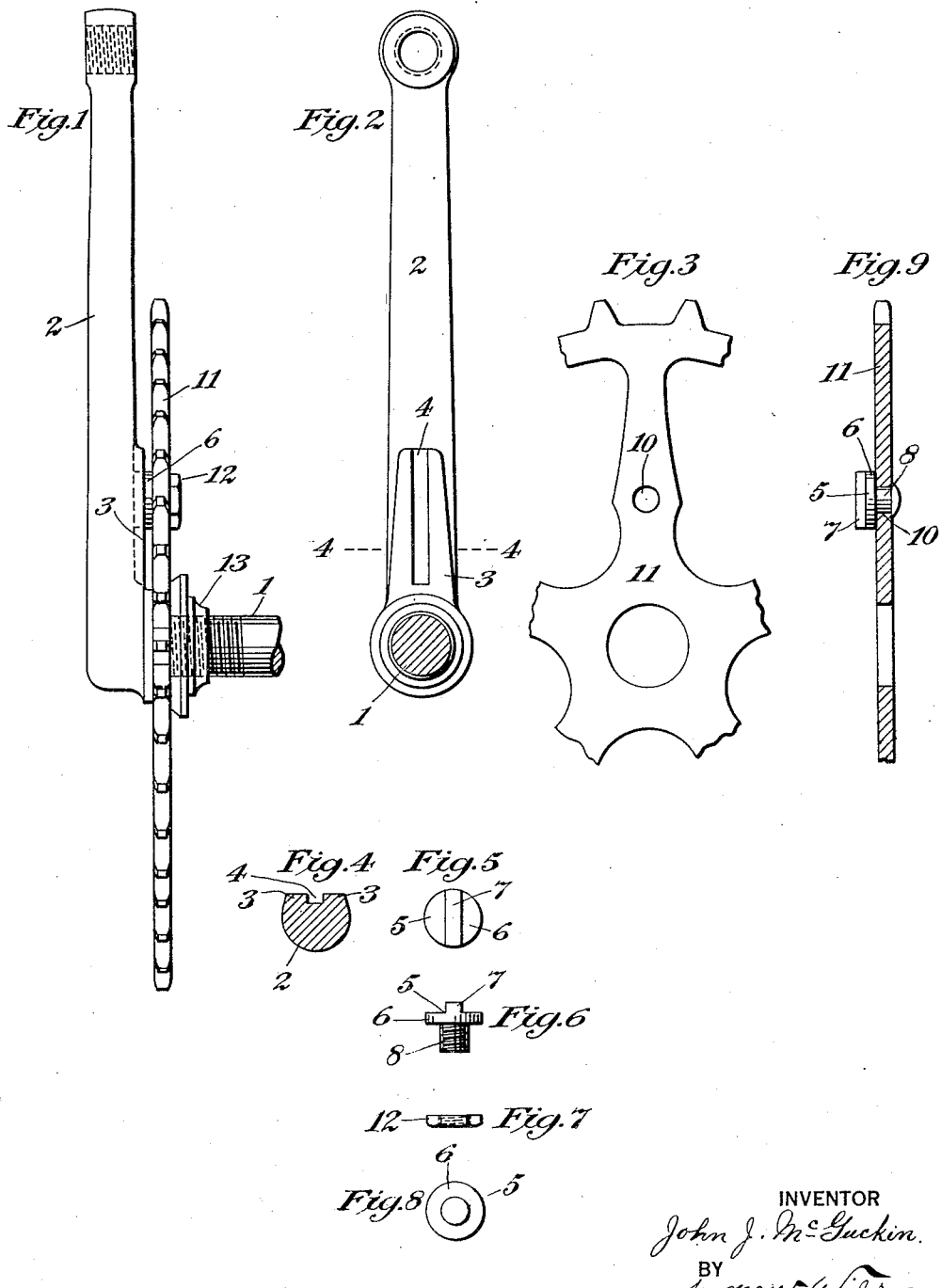

JOHN J. McGUCKIN, OF BROOKLYN, NEW YORK, ASSIGNOR TO LOUIS SCHWAB, DOING BUSINESS AS STEVENS & COMPANY, OF NEW YORK, N. Y.

BICYCLE-CRANK.

1,358,225. Specification of Letters Patent. Patented Nov. 9, 1920.

Application filed November 21, 1919. Serial No. 339,530.

*To all whom it may concern:*

Be it known that I, JOHN J. McGUCKIN, a citizen of the United States, residing at No. 345 Avenue O, borough of Brooklyn, county of Kings, city and State of New York, have invented certain new and useful Improvements in Bicycle-Cranks, of which the following is a specification.

My invention relates to driving cranks for bicycles, and my improvements are particularly directed to means for connecting the sprocket wheel to the crank, so that the wheel will be driven by the crank, but can be readily disconnected therefrom and a new crank or new sprocket wheel of the same or of another size may be mounted when desired.

The particulars of my invention I will now proceed to point out and claim, referring, in so doing, to the accompanying drawings in which Figure 1 is a front view of a crank and sprocket wheel embodying my invention; Fig. 2 is a view of the crank looking to the left on Fig. 1, the sprocket wheel being removed; Fig. 3 is a segment of the sprocket wheel; Fig. 4 is a cross sectional view of the crank taken on the line 4—4 of Fig. 2 looking up; Fig. 5 is a top view of the stud; Fig. 6 is a side view of the same; Fig. 7 is an edge view of the nut; Fig. 8 is a bottom view of the stud; and Fig. 9 is a vertical section through the sprocket wheel, showing the stud permanently attached. Similar parts are designated by the same reference numerals in all the figures.

The shaft 1 is made in the usual form and carries the driving crank 2, having a raised portion 3 in which is formed a groove 4 of a substantially uniform character and extending downward toward the body of the crank 2.

A stud 5 embodies a disk-like head 6, a rib or flange 7, and a shank 8, which may be screw threaded as shown in Fig. 6. The shank of the stud is adapted to enter the hole 10 in the sprocket wheel 11, and to be secured therein by being screw threaded thereinto, or by being held by a nut as 12, or if a permanent connection is desired it may be riveted, as shown in Fig. 9. The flange 7 is adapted to enter the groove 4 in the crank; and the arrangement of the parts is such that when the cone 13 is screwed up, so as to set the sprocket wheel snugly into place against the hub of the crank 2, the head 6 of the stud will bear against the crank, and its flange 7 will be securely held in the groove 4.

It has been customary in the art to form a lug or stud integral with the crank, and to locate the hole 10 in the sprocket wheel so as to receive the stud. But in practice the holes 10 in various designs of sprocket wheels are located at different radial distances from the center of the wheel, so that the different sprocket wheels may not be interchangeably used with the same crank, nor vice versa.

My improvement, however, provides adjustable means for connecting the crank and the sprocket wheel, so that although the stud may engage the sprocket wheels at varying distances from their centers, it will find a firm bearing in the crank adapted to receive it at any of the positions in the usual range of variations of the sprocket wheel hole 10.

The flange 7 may be made to fit snugly in the groove 4, and the length of its bearing in the groove is sufficient to provide against wear and consequent loosening in ordinary use. Also, the tight fit, which is obtainable between the shank of the stud and the sprocket wheel, precludes side play and consequent wear which are common when a stud formed integral with the shank is simply slipped into a hole in the sprocket wheel.

My improvements therefore afford a snug, durable and adjustable connection between a crank and a variety of sprocket wheels; permit the removal and replacement of parts, and, even when the stud is permanently secured to a sprocket wheel, as in Fig. 9, another sprocket wheel may be mounted on the shaft by simply using another stud.

Obviously my improvements may be modified in detail, as by the use of mechanical equivalents, without departing from the spirit of my invention as claimed.

Having thus described my invention, what I claim and desire to secure by Letters Patent of the United States is:

1. The combination, with a bicycle driving shaft and a crank arm, of a sprocket wheel, and means for preventing relative rotation of the crank arm and sprocket wheel, such means being adapted to engage the crank arm at selectively varied distances from the shaft.

2. The combination, with a bicycle driving shaft and a crank arm, of a sprocket wheel, and a stud constituting means for preventing relative rotation of the crank arm and sprocket wheel, such stud being adapted to engage the crank arm at selectively varied distances from the shaft.

3. The combination, with a bicycle driving shaft and a crank arm provided with a longitudinally extended seat, of a sprocket wheel, and means for preventing relative rotation of the crank arm and sprocket wheel, such means being adapted to engage the seat of the crank arm at selective varied distances from the shaft.

4. The combination, with a bicycle sprocket wheel provided with stud engaging means, a shaft, a crank arm provided with means for engaging a stud at varying distances from the shaft, and a coöperating stud having integral means for spacing the sprocket wheel from the crank arm.

5. The combination, with a bicycle shaft, and a driving crank provided with a stud-bearing constituting means for engaging a sprocket holding stud at selectively varied distances from the shaft, of either of a plurality of sprocket wheels each having a stud-bearing in a different radial position from the others, and a stud adapted to coöperate between said driving crank and either of said sprocket wheels and to prevent relative rotation of such crank and wheel.

6. The combination, with a bicycle driving crank provided with a groove constituting a stud bearing, a sprocket wheel having a stud engaging hole therein, a stud with a neck adapted to be secured in said hole, an expanded head and a flange upon the head to engage with said groove in the driving crank.

7. The combination, with a bicycle shaft and a driving crank provided with means for engaging sprocket holding means at selectively varied distances from the shaft, of either of a plurality of sprocket wheels each having a bearing for holding means in a different radial position from the others, and holding means adapted to coöperate with said crank and with either of said sprocket wheels.

8. A driving crank for bicycles and the like provided with an extended bearing seat for engaging a sprocket holding stud at various radial distances.

JOHN J. McGUCKIN.